Patented June 17, 1930

1,764,839

UNITED STATES PATENT OFFICE

WILLIAM HOSKINS, OF CHICAGO, ILLINOIS

PLASTIC COMPOSITION

No Drawing.   Application filed April 7, 1924. Serial No. 704,860.

The present invention relates to improvements in plastic compositions, and more particularly in those containing proteins, such as gelatine, glue, and like substances as their essential constituents.

In accordance with the present invention, bodies are formed of such plastic masses containing, in addition to the protein constituents, a sulfonated fatty oil together with any desired fillers, hardening agents and the like. An aqueous solvent is employed to the extent necessary to give a solution of the desired fluidity, depending upon the purpose for which the material is intended. The proportion of sulfonated oil to the protein constituent may vary from 0.1 fluid ounce to 4 fluid ounces per pound of protein. Sulfonated cotton seed oil, sulfonated corn oil, sulfonated castor oil, or other sulfonated oils may be employed, sulfonated castor oil being markedly superior in its properties to other sulfonated oils.

The composition of the present invention is more particularly adapted for use in the formation of sheets or films, or of plastic bodies built up by a succession of thin films. The following composition may suitably be employed for such purposes.

Example No. 1

Gelatine, one pound; sulfonated castor oil, 2.8 fluid ounces; water 8 pounds; fillers in any desired proportion, up to one pound. Pigments or dyes may be added, as desired.

If desired, suitable hardening agents, such as formaldehyde, hexamethylenetetramine, and the like, may be incorporated in the plastic. In some cases, it is found desirable also to include small proportions of preserving agents, such as phenol, thymol, and the like. The following composition illustrates an embodiment of the invention suitable for use, for example, in the manufacture of exceedingly thin films of a material suitable for use in wrapping candies, food products and the like.

Example No. 2

Gelatine 1 pound; sulfonated castor oil 3.4 to 4 fluid ounces; glycerine 1 to 2 fluid ounces; potassium bichromate 60 grains; formaldehyde (40%) 2 to 4 ounces; phenol, 0.3 to 0.5 ounces and water, 2 to 3 pounds, together with suitable dyes or pigments.

These compounds have been found particularly suited, as hereinbefore stated, for the formation of thin films, for example, by the process described in my prior application Serial No. 562,726, filed May 22, 1922, in which a continuous or progressive method of manufacturing such films is disclosed. The films thus produced are strong, transparent and permanently pliable. The compositions may likewise be employed in forming films or building up articles by dipping, coating, spraying or the like.

I claim:

1. A plastic composition comprising gelatine and sulfonated castor oil, in the proportions of 0.1 to 4 fluid ounces per pound of gelatine.

2. A plastic composition comprising gelatine and sulfonated fatty oil in the proportion of 0.1 to 4 fluid ounces per pound of gelatine, and a hardening agent.

3. A thin, paper-like self-sustained sheet consisting essentially of gelatine and sulfonated castor oil in the proportion of 0.1 to 4 ounces per pound of gelatine.

4. A thin, paper-like self-sustained sheet consisting essentially of gelatine, sulfonated castor oil in the proportion of 0.1 to 4 ounces per pound of gelatine, and a hardening agent.

5. A self sustaining, transparent flexible sheet of non hygroscopic character comprising gelatine and 5 to 20% of sulphonated castor oil.

WILLIAM HOSKINS.